(12) United States Patent
De Lemos et al.

(10) Patent No.: US 8,775,617 B2
(45) Date of Patent: Jul. 8, 2014

(54) METHOD FOR OPTIMIZING NETWORK PERFORMANCE AFTER A TEMPORARY LOSS OF CONNECTION

(75) Inventors: Ricardo L. De Lemos, Boca Raton, FL (US); Gary Edward Mora, Boca Raton, FL (US); Jeffrey B. Cripe, Boynton Beach, FL (US)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 0 days.

(21) Appl. No.: 13/808,646

(22) PCT Filed: Jul. 18, 2012

(86) PCT No.: PCT/US2012/047104
§ 371 (c)(1),
(2), (4) Date: Jan. 7, 2013

(87) PCT Pub. No.: WO2013/103387
PCT Pub. Date: Jul. 11, 2013

(65) Prior Publication Data
US 2013/0185425 A1 Jul. 18, 2013

Related U.S. Application Data

(60) Provisional application No. 61/583,747, filed on Jan. 6, 2012.

(51) Int. Cl.
*G06F 15/173* (2006.01)
*H04L 12/26* (2006.01)
*H04L 12/24* (2006.01)

(52) U.S. Cl.
CPC ......... *H04L 43/0811* (2013.01); *H04L 41/0803* (2013.01); *H04L 41/0816* (2013.01)
USPC .......................................... 709/224; 709/220

(58) Field of Classification Search
CPC .. H04L 41/0803; H04L 41/0816; H04L 43/04
See application file for complete search history.

(56) References Cited

U.S. PATENT DOCUMENTS

2002/0081971 A1 * 6/2002 Travostino ...................... 455/41
2002/0082927 A1 6/2002 Borenstein
(Continued)

OTHER PUBLICATIONS

International Search Report for PCT/US2012/047104 dated Oct. 11, 2012.

(Continued)

*Primary Examiner* — Patrice Winder
*Assistant Examiner* — Nam Tran
(74) *Attorney, Agent, or Firm* — Buchanan Ingersoll & Rooney PC

(57) ABSTRACT

A communication apparatus includes a computer supported telecommunications application ("CSTA") session established between a computing function and switching function that includes a time period where monitors and registrations are preserved by the switching function if the computing function is able to restart the session within that time period after a temporary connection failure. The switching function tracks call and non-call related device activity that occurs from the time a session failure is detected until the computing function is able to restart the application session in a first list. If the computing function restarts that application within the time period, the switching function sends the computing function a list of devices whose activity was detected during the outage. The computing function uses the list of devices to query the status of those devices to reduce the amount of time needed to perform a recovery and less system performance impacts.

15 Claims, 3 Drawing Sheets

(56) References Cited

U.S. PATENT DOCUMENTS

2002/0116536 A1\* 8/2002 Clercq et al. .................. 709/250
2006/0015645 A1 1/2006 Ocko
2006/0136554 A1\* 6/2006 Rajaniemi et al. ............ 709/203

OTHER PUBLICATIONS

Written Opinion of the International Searching Authority for PCT/US2012/047104 dated Oct. 11, 2012.

\* cited by examiner

METHOD FOR OPTIMIZING NETWORK PERFORMANCE AFTER A TEMPORARY LOSS OF CONNECTION

CROSS-REFERENCE TO RELATED APPLICATIONS

This application is the United States national phase under 35 U.S.C. §371 of International Application No. PCT/US2012/047104, which was filed on Jul. 18, 2012 and claimed priority to U.S. Provisional Patent Application Ser. No. 61/583,747, which was filed on Jan. 6, 2012.

FIELD OF THE INVENTION

The present invention relates in general to the field of network communication. Specifically, the present invention provides a system and method for monitoring and failure detection during a computer implemented telecommunication application and optimizing the performance of the network after a temporary loss of connection between a computing function and a switching function.

BACKGROUND OF THE INVENTION

Networks can be broadly classified as Local Area Networks (LANs), Metropolitan Area Networks (MANs) and Wide Area Networks (WANs). These networks connect electronic devices together and enable them to communicate with one another. The electronic devices may include terminal communication devices (e.g. smart phones, laptops, computers, tablets, etc.), servers, hosts (processing units such as computers, printers or other peripheral devices), controllers, switches, gateways, and other network elements. These electronic devices in the network communicate with each other through communication channels. Underlying these channels are various physical devices. Examples of the physical devices include adapters that connect various network elements to the network, a cable or a bus that connects the adapters to a port on a network hub, the network switches that provide connectivity to each network element and the cables or buses that interconnect these network switches.

The full operation of a channel may be disrupted by a failure in any one of these underlying physical devices. The loss of communication can also take place in the case of a failure in the cable connecting an adapter to a network switch, or the port on the network switch to which the network element connects. The failure of some physical devices might also cause several network elements to lose their ability to communicate with one another. For example, if one of the network switches underlying a channel fails, then all the network elements that are connected through that network switch will lose their ability to communicate on that channel. However, other network elements, which connect to that channel through an operational underlying network switch, may not lose their ability to communicate on that same channel. This is an instance of a partially operational channel. A channel is said to be fully operational if connectivity to that channel is operational for all network elements configured to communicate on that channel.

Most networks offer many channels or pathways through which devices are connected to and communicate with one another. Networks are usually designed so that if one channel, pathway or device fails in a network then communication among the network elements can be rerouted through another pathway, channel or device. There are several methods which are known in the art for monitoring communication networks, identifying failures and rerouting communications in the network. Such systems and methods typically involve not only monitoring but also providing network element status reports to participants in the network. An example of a system and method for monitoring communications in a data network is disclosed in United States Patent Application Publication Nos. 2005/0144505 and 2006/0126654.

The loss of communication may be considered temporary if a connection is restored within a few seconds or a few minutes. The failure may disrupt communication to or from some but not all of the network elements in the network. If several network elements are communicating with one another when a failure occurs that affects some but not all of those network elements, some network elements will receive information that other network elements do not receive.

Consequently we have determined that there is a need for a method that will not only identify network failures, but also track communications activity that occurs during a failure and restart of an application by user devices utilizing a service when communication to that service is restored. In very large scale deployments, for example 40,000 to 50,000 users, the recovery of an application session by some users and its associated device monitors is only one aspect that impacts system performance during a computing function recovery phase of the recovery. To obtain current information, the computing function must also discover the current call and non-call status of each device in order to properly reflect this status toward its end users, which is typically not supported or provided for in most communication systems.

A new system and method is needed for recovering application sessions that temporarily experience a failure. We have developed such a system and method. Embodiments of our system and method may permit user device activity to be monitored during an outage so that such data may be utilized for updating an application restarted by a device that experienced a failure if that device recovers or restarts the application within a predetermined time period after the outage occurs.

SUMMARY OF THE INVENTION

A method for reestablishing a communication session, a system that may practice that method, and a computer readable medium having an application stored thereon that is executable by a switch device, and other apparatuses are provided that can be configured to permit a recovering application session or other communication session that temporarily experienced a failure to obtain updated information relating to the session upon restarting the session within a predetermined amount of time. Such information may be communicated by a switch device that performs monitoring of communication events for sending to a communication terminal device that restarts its session within the predetermined period of time.

One embodiment of a method for reestablishing a communication session connection can include a first communication terminal device establishing a communication session via communications with a switch device, the first communication terminal device experiencing a connection failure that makes the first communication terminal device unavailable for a first period of time during the communication session, and the switch device detecting the connection failure of the first communication terminal device. In response to detecting the connection failure, the switch device monitors communication events involving the first communication terminal device for a second period of time and saves information related to the monitored communication events in a list.

Upon a determination that the first communication terminal device reestablished a connection with the switch device for restarting the communication session within the second period of time, the switch device sends a first message to the first communication terminal device that includes information relating to at least a portion of information saved in the list and the first communication terminal device evaluates the first message to determine whether to engage in discovery services involving other devices for updating a user interface of the first communication terminal device.

The method may be configured for use with many different types of communication terminal devices such as telephones, computers, laptop computers, tablets, mobile telephones, mobile communication endpoints, or cellular telephones. The switch device may be any of a number of possible devices configured to provide a switching function, such as a server, a workstation or other computer device configured to provide a switching function according to the computer supported telecommunications application standards. Of course, the first communication terminal device may be a device that is configured to provide a computing function according to computer supported telecommunications application standards. It should be understood that some embodiments of the method may be configured so that the communication session is an application session according to computer supported telecommunications application standards. The discovery services the first communication terminal device may undertake that involve other devices for updating a user interface of the first communication terminal device may also be defined by to computer supported telecommunications application standards.

The method may include additional steps. For instance, the method may also include the step of the switch device deleting the list and stopping the monitoring of the communication events involving the first communication terminal device upon a determination that the first period of time surpassed the second period of time. As another example, the method could be configured so that the monitoring of the communication events involving the first communication terminal device for a second period of time and saving information related to the monitored communication events in the list can include saving information related to call events, and saving information related to non-call event. Additionally, the switch device may delete information from the list relating to information associated with events involving a communication device that experienced a status change from a connected state to an idle state so that the first message that is sent does not include information relating to the deleted information.

It should be appreciated that communication events involving the first communication terminal device may include information in monitors and registrations that is usable for permitting the first communication terminal device to restart the communication session. Additionally, the connection failure that is experienced by the first communication terminal device may be any of a number of types of failures. One such failure may be a heartbeat connection failure.

A communication system is also provided. The communication system may be configured to perform an embodiment of an above referenced method for reestablishing a communication session connection. The communication system may include one or more communication terminal devices and one or more switch devices.

One embodiment of the communication system may include a first communication terminal device and a switch device. The first communication terminal device may establish a communication session via communications with the switch device and subsequently experience a connection failure that makes the device unavailable for a first period of time during the communication session. The switch device may detect that failure and respond to it by monitoring communication events involving the first communication terminal device and saving information related to such events in a list. Upon a determination that the first communication terminal device reestablished a connection with the switch device for restarting the communication session within a second period of time the switch device may send a first message to the first communication terminal device that includes information related to at least a portion of the information saved in the list and the first communication terminal device may evaluate the first message to determine whether to engage in discovery services involving other communication devices for updating a user interface of the first communication terminal device.

In some embodiments of the system, the results of the evaluation of the first message by the first communication terminal device may result in the first communication terminal device engaging in discovery services of one or more communication devices. The discovery services may be discovery services defined by a computer supported telecommunications application standard.

The switch device may delete the list and stop monitoring of the communication events when the first period of tie is surpassed by the second period of time. For instance, the first period of time may define a time period associated with temporary connection failures. If the communication session cannot be reestablished within this time period, the connection failure may be due to a more substantial error and not be a temporary failure that can be relatively quickly resolved by quickly establishing a reconnection.

The list may be stored in memory of the switch device or may be stored in memory of a separate computer device communicatively coupled to the switch device. For example, a workstation or computer may have a database that includes the list.

A non-transitory computer readable medium is also provided. Examples of such a computer readable medium include a DVD, compact disc, floppy disc, hard drive, memory of a server hosting an application store that permits downloads of an application, and other mediums on which one or more applications may be stored. The computer readable medium may have an application stored thereon that is executable by a processor unit of a switch device. The application may define steps of a method performed by the switch device when it is executed by the processor unit. The steps may be defined by different portions of program code that define the application. The method defined by the application can include the switch device establishing a communication session via communications with a first communications terminal device and the switch device detecting a connection failure of the first communication terminal device that renders the first communication terminal device unavailable for a first period of time during the communication session. In response to detecting the connection failure, the switch device may monitor communication events involving the first communication terminal device for a second period of time and save information related to the events in a list. Upon a determination that the first communication terminal device reestablished a connection with the switch device for restarting the communication session within the second period of time, the switch device sends a first message to the first communication terminal device that includes information relating to at least a portion of the information saved in the list.

The first message sent by the switch device may be usable by the first communication terminal device for determining whether discovery services need to be engaged in. Such discovery services may involve communications exchanged with other terminal devices that may result in obtaining information for updating a user interface of the communication terminal device.

The method defined by the application may also define other steps. Examples of additional steps of the method may include steps of a method discussed above or further discussed below. For instance, information saved in the list may be deleted if a status change from a connected status to an addle status occurred for a device that attempted to communication with the communication terminal device while it was unavailable. As another example, if the second period of time is surpassed by the first period of time, the switch device may delete the list and stop performing any monitoring.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred devices, systems, and methods for providing communications between multiple communication devices are shown in the accompanying drawings and certain present preferred methods of practicing the same are also illustrated therein. It should be understood that like reference numbers used in the drawings may identify like components.

DETAILED DESCRIPTION OF PRESENT PREFERRED EMBODIMENTS

Figure 1:
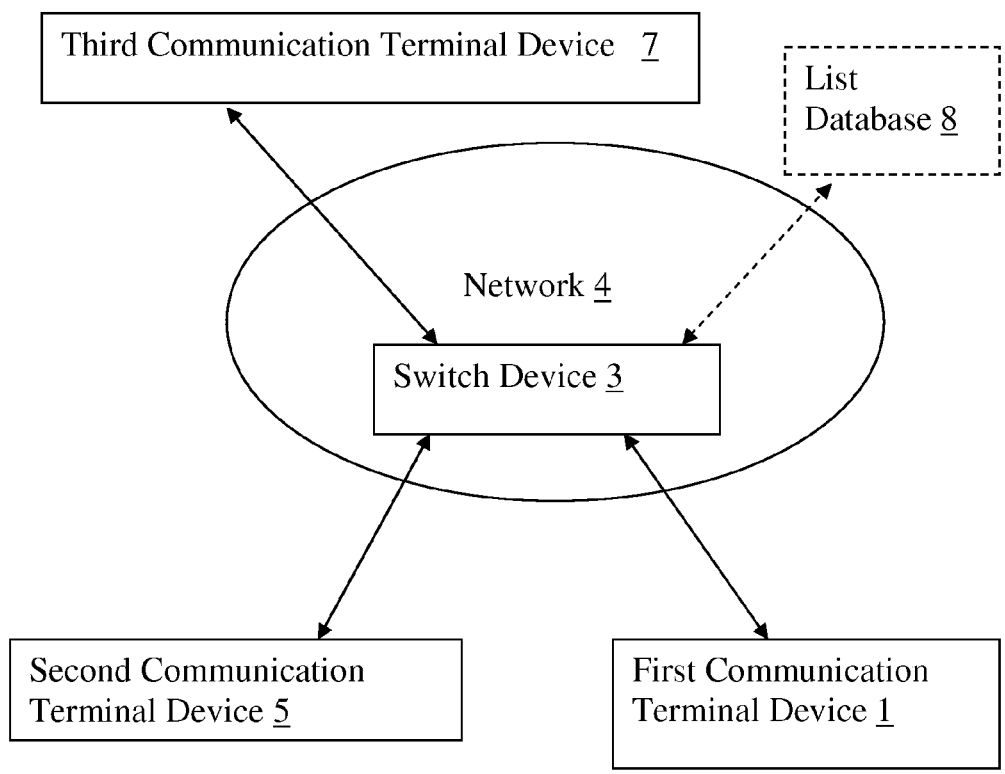
FIG. 1 is a block diagram of an exemplary embodiment of a communication system. An optional list database that may be utilized in embodiments of the system is shown in broken line.

In a computer supported telecommunications application ("CSTA") session established between a computing function and switching function we preserve for a selected time period data in monitors and registrations using the switching function. Then the computing function is able to restart the session within the selected time period after a temporary connection failure.

With embodiments of this invention the switching function is able to track call and non-call related device activity that occurs from the time the application session failure (loss of heartbeat or connection) is detected until the computing function is able to restart the application session in a smart "dirty monitors" list. If the computing function restarts the application session within a selected time frame then the switching function will send the computing function a short list of devices were activity was detected during the outage. The computing function uses the list of devices provided by the switching function to query the current status for a much smaller number of devices. In a very large scale deployment this significantly improves the application recovery time and lessens system performance impacts.

Embodiments of this invention may permit the switching function to be able to logically track device activity during the outage. If the computing function is able to restart the application session within a predetermined time period after the outage is first experienced, the switching function is able to provide the recovering computing function with short list of devices were activity was detected and that need to be queried in order to update the associated user interfaces.

Embodiments of the invention may be configured as systems that are configured to utilize a methodology of operation as outlined below:

The switching function maintains a non-persistent cache that lists "dirty monitors".

The switching function provides intelligent tracking of "dirty monitors".

That begins once the switching function detects that the computing function heartbeat or connection has failed.

The switching function adds devices to the list of "dirty monitors" when call or non-call related events are produced but could not be sent to the computing function associated with the application session.

Call control events that cause a device to transition from "idle" to "connected" state are temporarily added to the list of "dirty monitors". If that device transitions from "connected" to idle it is removed from the list.

Non-call control events that are produced but not sent to the computing function such as; forwarding, do not disturb, callback, agent state, message waiting or device maintenance are added to the list of "dirty monitors".

If the computing function is unable to restart the application session within the selected time period all monitors are cancelled and any associated cached list of "dirty monitors" is cleared.

If the computing function is able to restart the application session within the selected time period the switching function sends the computing function system status (messagesLost) service which includes as a private extension the list of "dirty monitors" with the type of impact, call related information, or non-call related information.

The computing function uses the list of "dirty monitors" provided by the switching function to identify specific devices that require further discovery services such as snapshot device and call, get logical device information, get forwarding, get do not disturb, get message waiting information, get agent state and get callbacks. As a result the switching function the computing function are able to restore the application session at all network elements or monitors that had been participating in the application session when the failure occurred.

It should be appreciated that in many embodiments the computing function may be carried out by a terminal communication device or user device such as a computer, laptop, tablet, IP telephone, telephone, cellular phone, client device, or terminal computer device or other type of terminal communication device. The switching function may be implemented by a server that hosts a service or hosts an application accessed or otherwise utilized by a terminal communication device during a communication session.

In one embodiment, a server may maintain a non-persistent cache that lists "dirty monitors" and may provide intelligent tracking of the "dirty monitors" that begins once the switching function detects that a terminal device accessing an application or service hosted by the service has experienced a connection failure. Such a connection failure may be based on determining that a heartbeat signal was not received within a necessary time period to indicate that the connection between that device and the server has failed. As a result of the detected connection failure, the server may add the devices experiencing the connection failure to the list of "dirty monitors" when call or non-call related events are produced but could not be sent to the device associated with the application session or communication session. It should be understood that call control events that cause a device to transition from "idle" to "connected" state are temporarily added to the list of "dirty monitors". If that device then transitions from "connected" to "idle" it is removed from the list. For non-call related events, which may include call control events that are produced but not sent to a device such as forwarding, do not disturb, callback, agent state, message waiting or device maintenance, the non-call related events may be added to the list of "dirty monitors" and may not be subject to removal due to a change in status from "connected" to "idle".

If the terminal communication device is unable to restart the application session within the selected time period all monitors are cancelled and any associated cached list of "dirty monitors" is cleared. In contrast, if the terminal communication device is able to restart the application session within the selected time period the server sends the device a system status service message that includes as a private extension the list of "dirty monitors" with the type of impact; call or non-call related information. An example of such a system status service message may be a "messagesLost" message.

The terminal communication device then uses the received list of "dirty monitors" provided by the server to identify specific devices that require further discovery services such as a snapshot device and call, get logical device information, get forwarding, get do not disturb, get message waiting information, get agent state and get callbacks. As a result the server and terminal communication device are able to restore the application session at all network elements or monitors that had been participating in the application session when the failure occurred. The terminal devices that experienced the outage are able to rejoin the session with all the missing data obtained via the "dirty monitors" so that the rejoining of the session is seamless. Further, the terminals that did not experience such an outage do not receive such information from the server as such information is extraneous to those devices, which never experienced the outage. This helps reduce bandwidth usage and eliminates those devices having to process redundant information related to the session.

Figure 2:
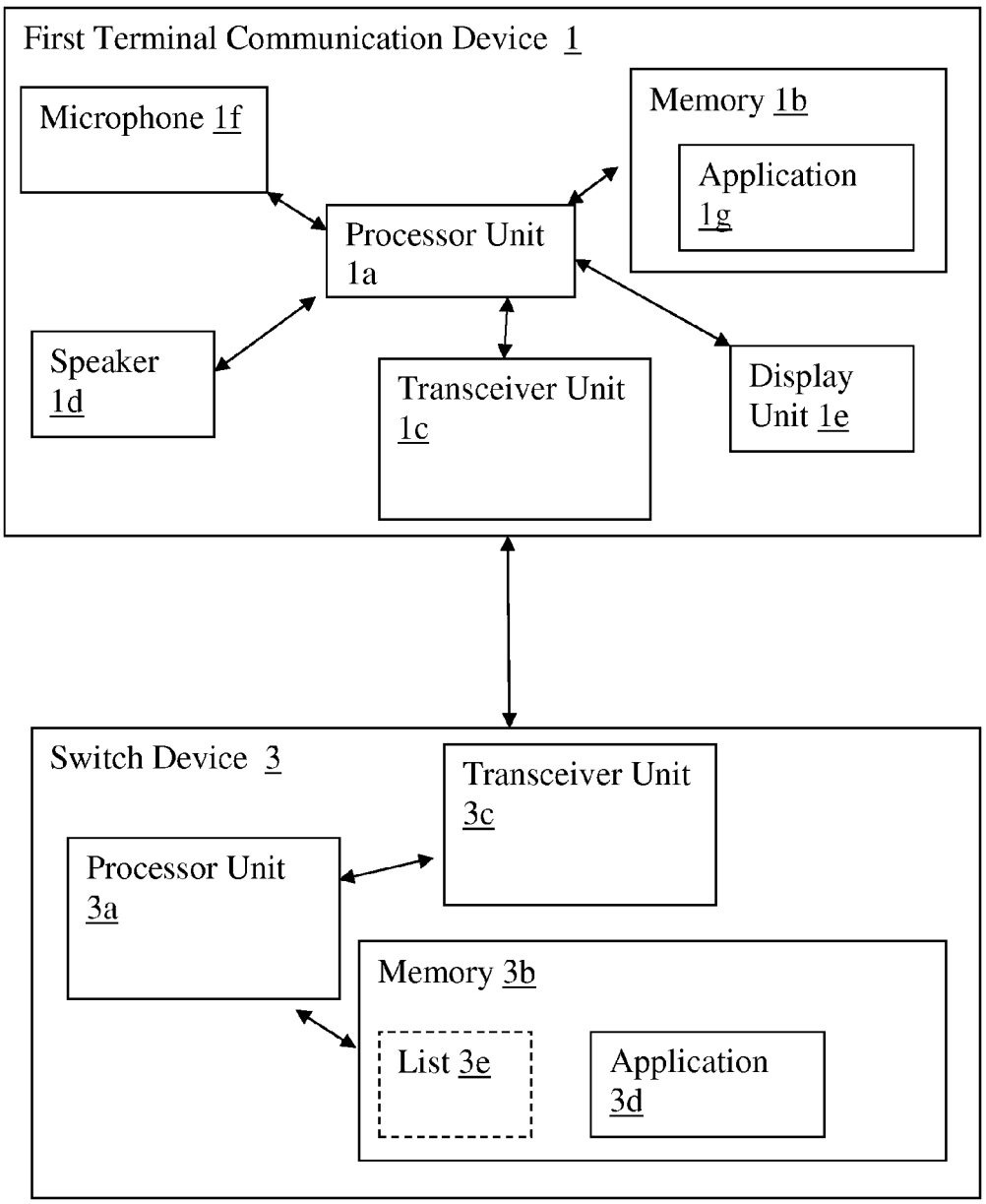
FIG. 2 is a block diagram providing a fragmentary view of the exemplary embodiment of the communication system that illustrates different components of the switch device and first communication terminal device shown in FIG. 1. A list stored on memory of a switch device is shown in broken line as the list may be stored in a list database or memory of another computer device that is communicatively coupled to the switch device in alternative embodiments of the system.
Figure 3:
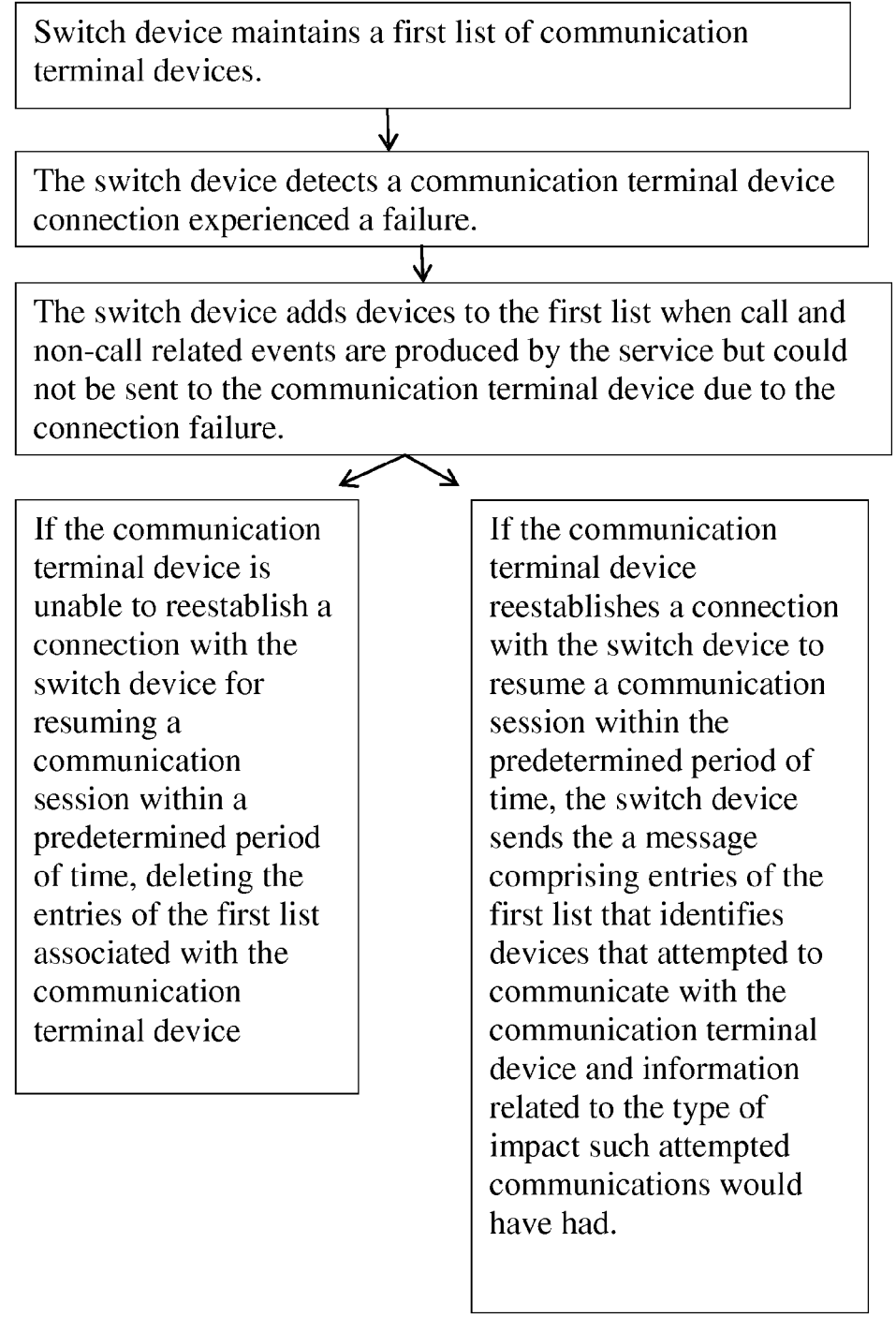
FIG. 3 is a flow chart illustrating an exemplary embodiment of a method for permitting a restarting of a communication session within a predetermined time period after the session experienced a temporary failure.

Embodiments of our apparatuses, systems and methods may be further appreciated by a further discussion of embodiments of our system, apparatus and method made with reference to FIGS. 1-3.

A switch device 3 may be within a network 4 such as an enterprise network. The switch device 3 may provide a switching function to a plurality of communication terminal devices communicatively coupled to the network 4. The communication terminal devices may be communicatively coupled to the network via the switch device 3 or may be communicatively coupled to the communication network 4 via one or more other network nodes such as a gateway, a router, a base station or an access point. The communication terminal devices may include a first communication terminal device 1, a second communication terminal device 5 and a third communication terminal device 7. Each of the communication terminal devices may be one of any number of communication endpoints such as a voice over internet telephone, a desktop computer having CSTA functionality, a laptop computer, a tablet, a mobile telephone, or a telephony device, or a computer device that functions as a computing function in accordance with CSTA standards. The switch device may be a server, workstation, or other compute device that provides a switching function in accordance with CSTA standards. The switch device may host an application service or a communication service such that communication terminal devices may communicate with the switch device 3 for participating in a communication session such as an application session or other type of communication session.

It should be appreciated that the switch device 3 may be communicatively coupled to each communication terminal device via a route that is defined by one or more intermediary network nodes. Alternatively, the switch device 3 may be directly communicatively coupled to one or more of the communication terminal devices. The communication connection between the switch device 3 and communication terminal devices permits messages and data to be exchanged between the devices. The switch device 3 is also able to support communication sessions established between one or more of these communication terminal devices and other communication terminal devices.

The switch device 3 may include a processor unit 3a, memory 3b that has an application 3d stored thereon and a transceiver unit 3c. The transceiver unit 3c may include one or more receiver units and one or more transmitter units. The processor unit 3a may include one or more microprocessors, central processing units, or other processor element that is communicatively coupled to the memory 3b so that it can execute at least one application 3d stored thereon. The application 3d may define steps of a method that the switch device 3 performs by the processor unit 3a executing program code of the application 3d. Steps of such a method may include steps illustrated in FIG. 3 and discussed more fully below. Steps of such a method may also be appreciated from the above. The processor unit 3a may also be communicatively connected to the transceiver unit 3c.

Each communication terminal may include elements similar to the first communication terminal shown in FIG. 2. The first communication terminal 1 may include a processor unit 1a that is communicatively coupled to input devices such as a microphone 1f, buttons, a keyboard, and display unit 1e, which may be a touch screen display. The processor unit 1a may include one or more microprocessors, one or more central processing units, or other processing elements that may be communicatively coupled to memory for executing one or more applications stored on the memory. The processor unit 1a may also be communicatively coupled to output devices such as a speaker 1d and the display unit 1e. The speaker 1d may emit audio and the display unit 1e may display images. The display unit 1e may be for example a touch screen liquid crystal display. The processor unit 1a may also be communicatively coupled to memory 1b that has one or more applications 1g stored thereon so that the processor unit 1a may execute the application 1g. The processor unit 1a may also be communicatively connected to a transceiver unit 1c. The transceiver unit may include one or more receiver units and one or more transmitter units. It should be understood that the input devices communicatively coupled to the processor unit 1a may be actuated by a user to provide input to the processor unit 1a or for storage in memory 1b or for transmission via the transceiver unit 1c. The output devices may be communicatively coupled to the processor unit 1a to provide output to a user such as by producing output as one or more images, as audio, or as a combination of audio and at least one image.

The system shown in FIGS. 1-2 may be configured to operate to perform the method shown in FIG. 3. For example, the switch device 3 may maintain a first list of communication terminal devices and information relating to devices that attempt to contact communication terminal devices that have been detected as having lost a connection with the switch device due to a communication connection failure. The communication terminal devices of such a list may be devices that had formed a communication session or application session with the switch device 3 prior to experiencing the connection failure. The list may also include information indicating the type of contact event for each such contact event, such as non-call control events like forwarding, do not disturb, callback, agent state, message waiting, or device maintenance and call control events that could cause a device to transition from an idle state to a connected state.

The list could be a "dirty monitors" list that is maintained in memory 3d as a list 3e that is stored in the memory 3d of the switch device. Alternatively, the list could be maintained on a list database 8 and the switch device may communicate with the list database 8 to update the database and obtain information stored in the database for sending to one or more communication devices. The list database 8 may be a computer device such as a workstation, computer, or other computer device that has non-transitory memory and a transceiver unit for communicating with the switch device.

The switch device 3 may monitor ongoing CSTA communication sessions different communication terminals are engaged in to detect whether that communication terminal drops from a communication session due to a communication connection failure. Such a failure may be a temporary failure if a network node within a connection path on which the communication terminal relies temporarily is overwhelmed with traffic or fails and the communication terminal has to establish a new connection path for re-establishing the communication session.

Upon the switch device 3 detecting that a communication session failure occurred that affected the first communication terminal device 1 and its involvement in an ongoing communication session, the switch device 3 may add the first communication terminal device 1 to the list 3e or list maintained in the list database 8 for a predetermined amount of time that defines whether the connection failure is a temporary failure. The predetermined amount of time may be any of a number of time amounts to meet a particular design objective such as five seconds, ten seconds, twenty seconds, or thirty seconds. The switch device 3 may detect such a communication session failure upon a heartbeat connection between the switch device 3 and the first communication terminal device 1 resulting in a failure due to the first communication terminal device 1 not sending a heartbeat message within a prescribed time period.

After the first communication terminal device 1 experienced the communication session failure and was detected as having experienced such a failure by the switch device 3, the switch device 3 will monitor call and non-call related events that are produced by other communication terminal devices but could not be sent to the first communication terminal device due to the communication session failure. Each such communication event may be recorded and stored in the list 3e or the list of the list database 8. For instance, non-call control related events may be stored in the list 3e or the list of the list database 8. Additionally, call control related events that may change a call state may be added to such a list and subsequently deleted from that list based on how the call state changes while the first communication terminal device is unavailable.

If the first communication terminal device 1 is unable to reestablish a connection with the switch device 3 for resuming the communication session within the predetermined amount of time, the switch device may delete the entries in the list 3e associated with the first communication terminal device 1. Alternatively, if the first communication terminal device 1 reestablishes a connection with the switch device to resume the communication session within the predetermined period of time, the switch device 3 may send a message to the first communication terminal device 1 that identifies the devices that attempted to communicate with the first communication terminal device 1 during the time that the first communication terminal device 1 was unavailable, which is a time period that is within the first predetermined amount of time. The information included in the message may include information in the list 3e or list maintained by the list database 8 that is associated with the first communication terminal device 1 such as the different communication events detected by the switch device, when those events were detected, and the type of communication events that they were (e.g. call events or non-call events). In one embodiment, such a message may be formatted as a "messagesLost" service message in accordance with a CSTA standard.

In response to receipt of the message from the switch device, such as a "messagesLost" formatted message, the first communication terminal device identifies different devices that require further discovery services for responding to those communications. Examples of such further discovery services include, for example, Snapshot Device, Snapshot Call, Snapshot CallData, Snapshot DeviceData, Get Logical Device Information, Get Forwarding, Get Do Not Disturb, Get Message Waiting Information, Get Agent State, and Get Callback in accordance with CSTA standards. Of course, such discovery services may also include other discovery services defined by CSTA standards. The first communication terminal device may then update its user interface to account for the new information obtained by performing such discovery services. The user interface may include the display unit of the first communication terminal device.

It should be understood that systems that utilize embodiments of our invention may be configured to comply with Computer Supported Telecommunications Applications (CSTA) standards. Indeed Standard ECMA-217 may be particularly pertinent and provides background information related to systems in which our method can be used. Such standards are available from ECMA International via the internet at www.ecma-international.org.

While certain present preferred embodiments of the communication terminal, communication system, and methods of making and using the same have been shown and described above, it is to be distinctly understood that the invention is not limited thereto but may be otherwise variously embodied and practiced within the scope of the following claims.

What is claimed is:

1. A method for reestablishing a communication session connection comprising:
   a first communication terminal device establishing a communication session via communications with a switch device;
   the first communication terminal device experiencing a connection failure that makes the first communication terminal device unavailable for a first period of time during the communication session;
   the switch device detecting the connection failure of the first communication terminal device;
   in response to detecting the connection failure of the first communication terminal device, the switch device monitoring communication events involving the first communication terminal device for a second period of time and saving information related to the monitored communication events in a list; and upon a determination that the first communication terminal device reestablished a connection with the switch device for restarting the communication session within the second period of time:

the switch device sending a first message to the first communication terminal device, the first message comprising information relating to at least a portion of information saved in the list, and the first communication terminal device evaluating the first message to determine whether to engage in discovery services involving other communication devices for updating a user interface of the first communication terminal device.

2. The method of claim 1 further comprising:
upon a determination that the first period of time surpassed the second period of time, the switch device deleting the list and stopping the monitoring of the communication events involving the first communication terminal device.

3. The method of claim 1 wherein the first communication terminal device is a telephone, a computer, a laptop computer, an endpoint, a computer configured as a computing function according to computer supported telecommunications application standards, a tablet, a mobile telephone, or a cellular telephone.

4. The method of claim 1 wherein the switch device is a switching function according to computer supported telecommunications application ("CSTA") standards and the first communication terminal device is a computing function according to CSTA standards and the communication session is a CSTA session.

5. The method of claim 1 wherein the communication events involving the first communication terminal device is comprised of information in monitors and registrations that is usable for permitting the first communication terminal device to restart the communication session.

6. The method of claim 1 wherein the connection failure is a heartbeat connection failure.

7. The method of claim 1 wherein the discovery services are discovery services defined by computer supported telecommunications application standards and wherein the communication session is an application session.

8. The method of claim 1 wherein the user interface of the first communication terminal device is comprised of a display unit communicatively connected to the first communication terminal device and wherein the monitoring of the communication events involving the first communication terminal device for a second period of time and saving information related to the monitored communication events in the list is comprised of:

saving information related to call events;
saving information related to non-call events; and
the method further comprising:
the switch device deleting information from the list relating to information associated with events involving a communication device that experienced a status change from a connected state to an idle state such that the first message does not include information relating to the deleted information, the idle state being a call control event state in which the communication device is not connected to the switch device and the connected state being a call control event in which the communication device is connected to the switch device.

9. A communication system comprising:
a first communication terminal device; and
a switch device;
the first communication terminal device establishing a communication session via communications with the switch device;
the first communication terminal device experiencing a connection failure that makes the first communication terminal device unavailable for a first period of time during the communication session;
the switch device detecting the connection failure of the first communication terminal device;
in response to detecting the connection failure of the first communication terminal device, the switch device monitoring communication events involving the first communication terminal device for a second period of time and saving information related to the monitored communication events in a list; and
upon a determination that the first communication terminal device reestablished a connection with the switch device for restarting the communication session within the second period of time:

the switch device sending a first message to the first communication terminal device, the first message comprising information related to at least a portion of the information saved in the list, and the first communication terminal device evaluating the first message to determine whether to engage in discovery services involving other communication devices for updating a user interface of the first communication terminal device.

10. The system of claim 9 wherein upon a determination that the first period of time surpassed the second period of time, the switch device deleting the list and stopping the monitoring of the communication events involving the first communication terminal device.

11. The system of claim 9 wherein the switch device is a switching function according to computer supported telecommunications application ("CSTA") standards and the first communication terminal device is a computer device configured as a computing function according to CSTA standards and the communication session is a CSTA session and wherein the communication session is an application session.

12. The system of claim 11 wherein the communication events involving the first communication terminal device is comprised of information in monitors and registrations that is usable for permitting the first communication terminal device to restart the communication session with the switch device.

13. The system of claim 9 wherein the connection failure is a heartbeat connection failure.

14. The system of claim 9 further comprising a database, wherein the list is stored in the database.

15. The system of claim 9 wherein the list is stored in memory of the switch device.

* * * * *